United States Patent
Gai et al.

(10) Patent No.: US 10,288,936 B2
(45) Date of Patent: May 14, 2019

(54) BACKLIGHT MODULE AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xin Gai, Beijing (CN); Xiuyun Chen, Beijing (CN); Jieqiong Wang, Beijing (CN); Dae Keun Yoon, Beijing (CN); Zhidan Zhang, Beijing (CN); Miao Liu, Beijing (CN); Jingjun Du, Beijing (CN); Baocheng Huang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/565,900

(22) PCT Filed: Mar. 23, 2017

(86) PCT No.: PCT/CN2017/077871
§ 371 (c)(1),
(2) Date: Oct. 11, 2017

(87) PCT Pub. No.: WO2017/219724
PCT Pub. Date: Dec. 28, 2017

(65) Prior Publication Data
US 2018/0203298 A1    Jul. 19, 2018

(30) Foreign Application Priority Data
Jun. 21, 2016    (CN) .................... 2016 2 0610475 U (51) Int. Cl.
G02F 1/1333    (2006.01)
G02F 1/1335    (2006.01)
F21V 8/00    (2006.01)

(52) U.S. Cl.
CPC ...... G02F 1/133602 (2013.01); G02B 6/0011 (2013.01); G02B 6/0088 (2013.01);
(Continued)

(58) Field of Classification Search
CPC ......... G02F 1/133602; G02F 1/133308; G02F 1/133615; G02F 2001/133322; G02B 6/0011; G02B 6/0088
See application file for complete search history.

(56) References Cited

U.S. PATENT DOCUMENTS 8,749,730 B2 * 6/2014 Zhang .................. G02B 6/0088
349/61
9,395,483 B2 * 7/2016 Kondoh ............ G02F 1/133603
(Continued)

FOREIGN PATENT DOCUMENTS

CN    102661556 A    9/2012
CN    104613374 A    5/2015
(Continued)

OTHER PUBLICATIONS

International Search Report and Written Opinion dated Jun. 30, 2017, for corresponding PCT Application No. PCT/CN2017/077871.

*Primary Examiner* — James A Dudek
(74) *Attorney, Agent, or Firm* — Kinney & Lange, P.A.

(57) ABSTRACT

The present disclosure provides a backlight module and display apparatus. The backlight module includes: a back plate; a light guide plate provided on the back plate, at least one side of the light guide plate being provided with at least one first concave-convex structure; and at least one position-limiting component provided on the back plate, the position-limiting component comprising at least one second concave-convex structure, the at least one second concave-convex structure and the at least one first concave-convex structure being cooperated with each other and being rotatable with respect to each other within a plane where the light guide plate is located, such that a contact state between the cooperated first and second concave-convex structures is
(Continued)

switchable between an abutting contact state and an intermeshing state.

20 Claims, 4 Drawing Sheets

(52) U.S. Cl.
CPC .. *G02F 1/133308* (2013.01); *G02F 1/133608* (2013.01); *G02B 6/0085* (2013.01); *G02F 2001/133314* (2013.01); *G02F 2201/503* (2013.01)

(56) References Cited

U.S. PATENT DOCUMENTS

| | | | | |
|---|---|---|---|---|
| 2002/0125815 | A1* | 9/2002 | Wakita | G02F 1/133308 313/491 |
| 2003/0046849 | A1* | 3/2003 | Lin | G02F 1/133308 40/792 |
| 2004/0105045 | A1* | 6/2004 | Lee | G02F 1/133308 349/58 |
| 2007/0086212 | A1* | 4/2007 | Fang | G02B 6/0031 362/633 |
| 2009/0009946 | A1* | 1/2009 | Oomoto | F16M 13/02 361/679.27 |
| 2013/0135559 | A1* | 5/2013 | Deng | G02F 1/133608 349/65 |
| 2013/0215339 | A1* | 8/2013 | Yu | G02F 1/133615 349/5 |
| 2013/0215363 | A1* | 8/2013 | Zhang | G02B 6/0088 349/65 |
| 2013/0322117 | A1 | 12/2013 | Kuo et al. | |
| 2015/0124196 | A1 | 5/2015 | Ono | |

FOREIGN PATENT DOCUMENTS

| | | |
|---|---|---|
| CN | 104633543 A | 5/2015 |
| CN | 105674145 A | 6/2016 |
| CN | 205678520 U | 11/2016 |
| KR | 20090025552 A | 3/2009 |

* cited by examiner

BACKLIGHT MODULE AND DISPLAY APPARATUS

CROSS-REFERENCE TO RELATED APPLICATIONS

The present disclosure claims priority to Chinese Patent Application No. 201620610475.7 entitled "Backlight Module and Display Apparatus", filed on Jun. 21, 2016 before the Chinese Patent Office, which is incorporated herein by reference in its entirety.

BACKGROUND

The present disclosure relates to display field, and particularly to a backlight module and a display apparatus.

A backlight module mainly uses a light guide plate to convert a dot light source or linear light source into a planar light source, and may be applied in a flat display apparatus such as a liquid crystal display, a notebook computer, a digital camera, a monitor, a projector or the like, for providing a planar light source output having a uniform brightness, such that the flat display apparatus can normally display an image.

The light guide plate is generally disposed on a back plate. In prior arts, however, there is a problem that the light guide plate cannot be fixed firmly.

SUMMARY

One object of the present disclosure is to provide a backlight module and a display apparatus.

According to an aspect of the present disclosure, it provides a backlight module, comprising:

a back plate;

a light guide plate provided on the back plate, at least one side of the light guide plate comprising at least one first concave-convex structure; and at least one position-limiting component provided on the back plate, the position-limiting component comprising at least one second concave-convex structure, the at least one second concave-convex structure and the at least one first concave-convex structure being cooperated with each other and being rotatable with respect to each other within a plane where the light guide plate is located, such that a contact state of the cooperated first and second concave-convex structures is switchable between an abutting contact state and an intermeshing state.

In one example, the backlight module further comprising a recess or protrusion formed in or on at least one side of the light guide plate, wherein the first concave-convex structure is correspondingly provided on the recess or protrusion.

In one example, a surface of the recess or protrusion is adapted to a profile of a corresponding position-limiting component.

In one example, the recess or protrusion is in an arc shape.

In one example, the at least one first concave-convex structure is directly provided on a side of the light guide plate.

In one example, the backlight module comprises a plurality of the first concave-convex structures and the second concave-convex structures which are cooperated with each other so as to position the light guide plate at least in a three-point positioning way.

In one example, one of the at least one first concave-convex structure is cooperated with one of the at least one second concave-convex structure;

one of the at least one first concave-convex structure is cooperated with more than one of the at least one second concave-convex structure; or more than one of the at least one first concave-convex structure is cooperated with one of the at least one second concave-convex structure.

In one example, the first concave-convex structure is located at an upper position, a middle position, a lower position or any combination thereof on any side of the light guide plate.

In one example, the backlight module further comprises an elastic member connected with the position-limiting component and configured to control rotation of the second concave-convex structure.

In one example, the elastic member comprises a torsion spring or elastic remontoir.

In one example, the light guide plate has a first state and a second state, the first state being a state in which the light guide plate is not subject to heat expansion, the second state being a state in which the light guide plate is subject to heat expansion;

a first protrusion of the first concave-convex structure is in abutting contact with a corresponding first protrusion of the second concave-convex structure if the light guide plate is in the first state;

if the light guide plate is switched from the first state into the second state due to thermal expansion, the second concave-convex structure is pressed by the light guide plate to rotate in a first direction against the elastic member of the backlight module, such that the first concave-convex structure is meshed with the second concave-convex structure; and if the light guide plate is switched from the second state into the first state due to thermal contraction, the elastic member restores to drive the second concave-convex structure to rotate in a second direction, such that the first protrusion of the first concave-convex structure is driven in re-abutting contact with the corresponding first protrusion of the second concave-convex structure, wherein one of a clockwise direction and a counterclockwise direction is selected as the first direction, and the other is correspondingly selected as the second direction.

In one example, the position-limiting component comprises a gear.

In one example, the gear is made of steel or plastic.

In one example, the backlight module further comprising a connection member or an adhesive between the position-limiting component and the elastic member, the connection member or adhesive being configured to arrange the position-limiting component on the back plate.

In one example, the connection member comprises a stud bolt or pin shaft fixedly connected with or integrally formed with the position-limiting component.

In one example, the back plate is provided with a through hole or groove, and the connection member is arranged in the through hole or groove, such that the second concave-convex structure is, when being pressed by the light guide plate, rotated around the connection member as a rotation axis relative to the first concave-convex structure within the plane where the light guide plate is located.

According to a second aspect of the present disclosure, there is provided a display apparatus comprising the backlight module described above.

DETAILED DESCRIPTION

In order to make problems to be solved, technical schemes and advantages of the present disclosure more definite, detailed description will be made hereinafter with reference to the drawings and exemplary embodiments.

Figure 1:
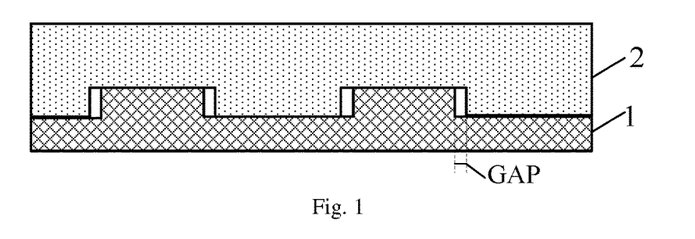
FIG. 1 is a structural schematic diagram of a backlight module according to an embodiment of the present disclosure.

As shown in FIG. 1, in a backlight source structure, a light guide plate 2 is provided on a back plate 1, a surface of the light guide plate 2 in contact with the back plate 1 is provided with a recess for being fixedly cooperated with the back plate. Since heat from the backlight source will cause the light guide plate 2 to expand in a horizontal direction, it is required to provide the recess with a margin for expansion (denoted by reference sign GAP in FIG. 1).

With this structure design, the backlight source will not be firmly fixed to the back plate in case of not being subject to heat, and will be easily shaken when be moved, resulting in structure damage thereto. In contrast, the size of the light guide plate will be changed in case of being subject to heat such that fixation of the light guide plate to the back plate will become relatively firmer.

In some cases, however, it is desirable to always firmly fix the light guide plate while having a space allowing the light guide plate to expand therein.

Figure 2:
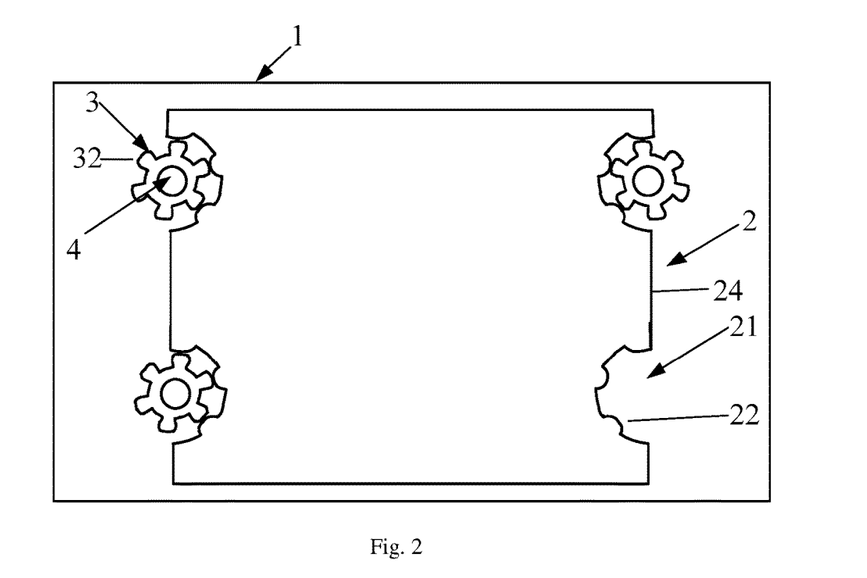
FIG. 2 is a structural schematic diagram of a backlight module according to another embodiment of the present disclosure.

Referring to FIG. 2, another embodiment of the present disclosure provides a backlight module, comprising: a back plate 1, a light guide plate 2 provided on the back plate 1 and at least one position-limiting component 3 provided on the back plate 1.

At least one side 24 of the light guide plate 2 is provided with at least one first concave-convex structure 22. In this embodiment, at least one recess 21 is also provided in at least one side of the light guide plate 2. The first concave-convex structure 22 is arranged in a corresponding recess 21 of the light guide plate 2, for example, on a surface of the recess 21. FIG. 2 shows that each of upper and lower ends on either side of the light guide plate 2 is provided with two recesses 21 and two first concave-convex structures 22. It will be appreciated by those skilled in the art that numbers of the recesses 21 and the first concave-convex structures 22 are not limited herein, and the numbers and positions of the recess 21 and the first concave-convex structure 22 may be set as required.

For example, in one example, the first concave-convex structure 22 may be located on any side 24 of the light guide plate 2, 2', 2", and specifically, the first concave-convex structure 22 may be placed or provided at an upper position, a middle position, a lower position or any combination thereof of the side 24.

Figure 6:
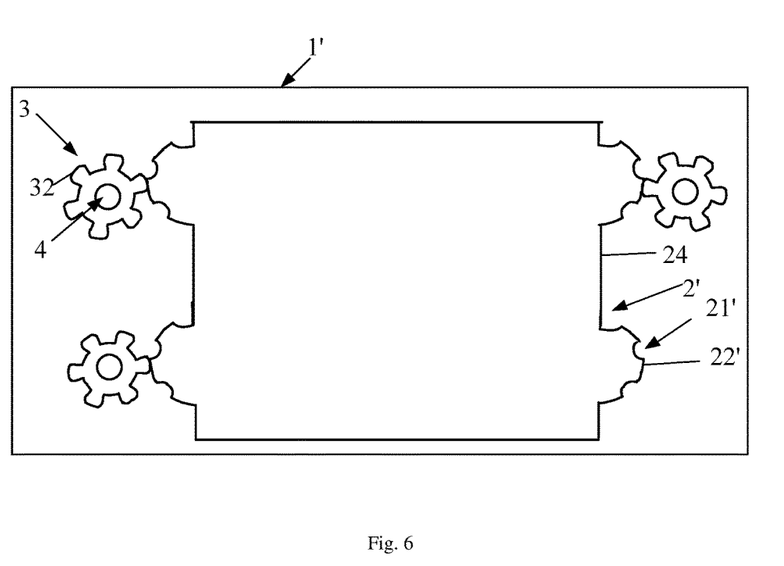
FIG. 6 is a structural schematic diagram of a variant example of a backlight module of the present disclosure.

Similarly, as shown in FIG. 6, the first concave-convex structure 22' may be also provided on a protrusion 21' on at least one side 24 of the light guide plate 2'. In one example, a surface of the recess 21 or the protrusion 21' may be adaptable to the profile of a corresponding position-limiting component 3, regardless of the first concave-convex structures 22, 22' being provided in the recess 21 or on the protrusion 21'. In illustrated examples, the recess 21 or the protrusion 21' is in an arc shape.

Figure 7:
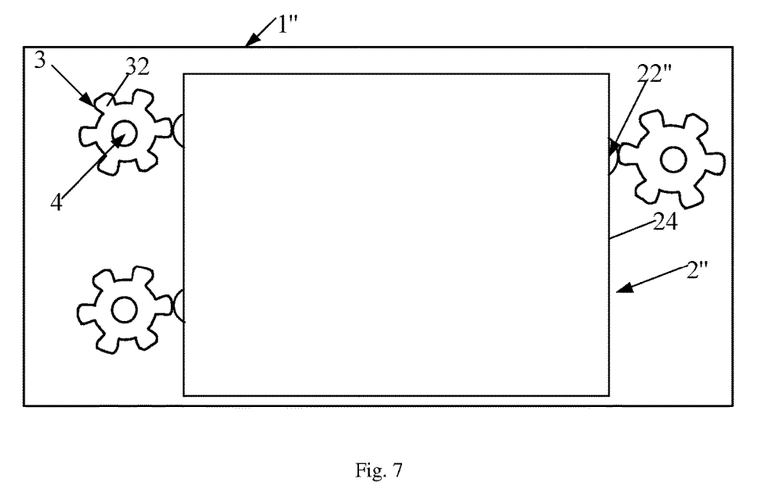
FIG. 7 is a structural schematic diagram of another variant example of a backlight module of the present disclosure.

As shown in FIG. 7, a first concave-convex structure 22" may be directly provided on a side 24 of a light guide plate 2".

In this embodiment, the position-limiting component 3 comprises at least one second concave-convex structure 32, the second concave-convex structure 32 and the first concave-convex structure 22 are cooperated with each other and rotatable with respect to each other within a plane where the light guide plate 2 is located (for example, within a plane of the page shown in figures), such that a contact state between the cooperated first concave-convex structure 22 and second concave-convex structure 32 with each other is switchable between an abutting contact state and an intermeshing state.

It is noted that the term "abutting contact" used herein indicates that a portion (for example, protrusion) of first concave-convex structure and a portion (for example, protrusion) of the second concave-convex structure are in contact with each other and limit movement with respect to each other; the term "intermeshing" indicates that a portion (for example, protrusion) of first concave-convex structure and a portion (for example, recess between protrusions) of the second concave-convex structure are cooperated with each other, for example, are meshed with each other likes two gears.

In one example, a plurality of the first concave-convex structures 22 and a plurality of the second concave-convex structures 32 are provided such that they are cooperated with each other so as to position the light guide plate 2 at least in a three-point positioning way. For example, in the example shown in FIG. 2, two first concave-convex structures 22 are provided on the left side of the light guide plate 2, while only one first concave-convex structure 22 is provided on the right side of the light guide plate 2, such that the light guide plate 2 may be positioned in a three-point positioning way. Of course, each of the left and right sides of the light guide plate 2 may be provided with two first concave-convex structures 22, thereby achieving four-point positioning; and the like, more-point positioning may be achieved in a similar way and will not be repeatedly described.

It will be understood by those skilled in the art that more than one position-limiting component 3, for example, two, three or more position-limiting components 3, may be provided in each recess 21 as required. That is, the cooperation or engagement between the first concave-convex structure 22 and the second concave-convex structure 32 is not limited to the one-to-one correspondence shown in the figures, and it is also possible that one first concave-convex structure 22 is cooperated with more than one second concave-convex structure 32, or more than one first concave-convex structure 22 is cooperated with one second concave-convex structure 32.

In the following, an example where one first concave-convex structure 22 is provided in one recess 21 and one first concave-convex structure 22 is cooperated with one second concave-convex structure 32 will be described to illustrate inventive concept of the present disclosure, but obviously the present disclosure is not limited to this.

In one example, the position-limiting component 3 is a gear, which is made of steel or plastic. In this case, a tooth or protrusion and a recess of the gear constitute the second concave-convex structure 32.

Figure 5:
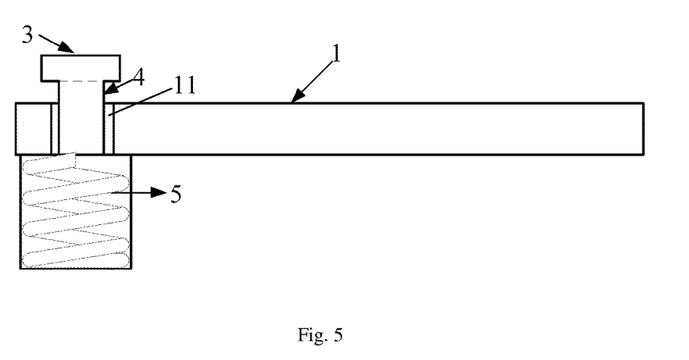
FIG. 5 is a structural schematic diagram of the position-limiting component and a connection member shown in FIG. 2.

Referring to FIG. 5, the backlight module of this embodiment further comprises an elastic member 5. The elastic member 5 is connected with the position-limiting component 3, and configured to restrict or control rotation of the second concave-convex structure 32 in the plane where the light guide plate 2 is located.

In actual applications, the elastic member 5 of this embodiment may be a torsion spring or an elastic remontoir. Of course, the elastic member 5 may be other known members which have similar functions to the torsion spring or elastic remontoir and which will not be exemplified herein.

Specifically, the backlight module of this embodiment may further comprise a connection member or an adhesive 4, which is located between the position-limiting component 3 and the elastic member 5 and configured to locate the position-limiting component 3 on the back plate 1.

In one example, the position-limiting component 3 is provided on the back plate 1 by using the adhesive 4.

In another example, the connection member 4 of this embodiment may also be a stud bolt or pin shaft inserted into the back plate 1. Of course, the connection member 4 may be other known members which have similar functions to the stud bolt or pin shaft and which will not be exemplified herein. Accordingly, the position-limiting component 3 is a gear, and the gear is located on the stud bolt or pin shaft and rotatable with the stud bolt or pin shaft as an axis relative to the first concave-convex structure 22 within the plane.

In this embodiment, the connection member 4 may also be fixedly connected with or integrally formed with the position-limiting component 3. The back plate 1 is provided with a through hole 11 (which may also be a groove structure), and the connection member 4 is disposed in the through hole 11, such that the second concave-convex structure 32 is, when being pressed by the light guide plate 2, rotated together with the elastic member 5 within the through hole 11 with the connection member 4 as an axis.

Taking the connection member 4 and the elastic member 5 being an elastic remontoir as an example, the elastic member 5 may clutch the connection member 4. The second concave-convex structure 32 of the position-limiting component 3, when being pressed by the light guide plate 2, need to overcome a constraining force from the elastic member 5 so as to drive the elastic member 5 to rotate together therewith. This rotation will wind-up the elastic member 5. When the light guide plate 2 is reduced in volume due to thermal contraction, the second concave-convex structure 32 of the position-limiting component 3 is not pressed, so that the second concave-convex structure 32 of the position-limiting component 3 reversely rotates by means of spring resetting of the elastic member 5.

Figure 3:
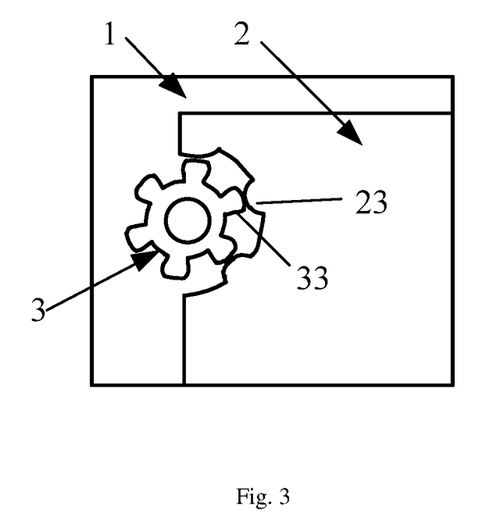
FIG. 3 is a schematic diagram showing a relative position relation between a side of a light guide plate in a non-expansion state and a position-limiting component shown in FIG. 2.

Referring to FIG. 3, shown is an enlarged view of a contact region between the position-limiting component 3 and the light guide plate 2 when the light guide plate 2 is in a non-expansion state. When the light guide plate 2 is in a first state (the first state is a state in which the light guide plate 2 is not subject to heat expansion), a first protrusion 23 of the first concave-convex structure 22 provided on the surface of the recess 21 of the side 24 of the light guide plate 2 abuts against a corresponding first protrusion 33 of the second concave-convex structure 32 of the position-limiting component 3, such that movement of the light guide plate 2 towards to a side thereof away from the position-limiting component 3 is limited by the position-limiting component 3.

Figure 4:
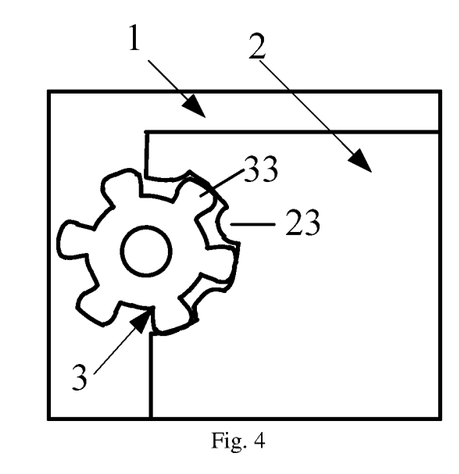
FIG. 4 is a schematic diagram showing a relative position relation between a side of the light guide plate in an expansion state and the position-limiting component shown in FIG. 2.

Referring to FIG. 4, shown is another enlarged view of a contact region between the position-limiting component 3 and the light guide plate 2 when the light guide plate 2 is in a second state (the second state is a state in which the light guide plate 2 is subject to heat expansion). When the light guide plate 2 is switched from the first state into the second state due to expansion, the second concave-convex structure 32 of the position-limiting component 3 is pressed by the expanded light guide plate 2 to rotate against the elastic member 5 in a first direction (for example, a counterclockwise direction shown in the figure) within the plane where the light guide plate 2 is located, such that the first concave-convex structure 22 of the light guide plate 2 and the second concave-convex structure 32 of the position-limiting component 3 are switched into intermeshing from the protrusion abutting shown in FIG. 3; during this process, the expanded light guide plate 2 is still limited in place by the position-limiting component 3. In the example shown in FIG. 4, three first protrusions 33 of the second concave-convex structure 32 are meshed with three recesses of the first concave-convex structure 22 adjacent to the first protrusions 23, thereby achieving a better limit effect.

When the light guide plate 2 is returned or switched into the first state from the second state due to contraction, the elastic member 5 drives, by means of its elasticity, the second concave-convex structure 32 of the position-limiting component 3 to rotate in a second direction opposite to the first direction (for example, a clockwise direction), such that the first protrusion 23 of the first concave-convex structure 22 of the light guide plate 2 becomes re-abutting contact with the corresponding first protrusion 33 of the second concave-convex structure 32 of the position-limiting component 3, thereby restoring the limit effect in the first state.

As can be seen in this embodiment, an expansion space is provided for the light guide plate 2 through relative movement generated due to change in contact of two concave-convex structures 22, 32 in different states, such that position-limiting component 3 can effectively provide the limit effect before or after expansion of the light guide plate 2, thereby the light guide plate 2 can be always be firmly fixed on the back plate 1.

Specifically, referring to FIG. 2, when the recess 21 is in an arc shape and the profile of an inner surface of the recess 21 matches with the profile of the position-limiting component 3, the recess 21 can enclose a portion of the position-limiting component 3, thereby reducing the volume of the whole device.

It is noted that FIG. 2 is only intended for exemplary illustration, and in practice, it is not necessary that each side 24 of the light guide plate 2 is provided with the recess 21 for engaging or cooperating with the position-limiting component 3, for example, the side of the light guide plate 2 on which a light source is arranged needs not be provided with the recess 21.

Referring to FIG. 6 again, an embodiment of the present disclosure further provides another variant example of the backlight module. This variant example differs from the above examples mainly in that the first concave-convex structure 22' is provided on the protrusion 21'. In such a case, when the light guide plate 2' is in a state of not being subject to heat expansion (first state), the first protrusion of the first concave-convex structure 22' is in abutting contact with the corresponding first protrusion of the second concave-convex structure 32; when the light guide plate 2' is switched into the second state (a state in which the light guide plate 2' is subject to heat expansion) from the first state, the second concave-convex structure 32 is pressed by the light guide plate 2' so as to rotate in a first direction against the elastic member 5 of the backlight module, such that the first concave-convex structure 22' is meshed with the second concave-convex structure 32. Since the first concave-convex structure 22' is provided on the protrusion 21', only one recess of the first concave-convex structure 22' adjacent to the first protrusion is meshed with one first protrusion of the second concave-convex structure 32 in most cases.

When the light guide plate 2' is switched into the first state from the second state due to thermal contraction, the elastic member 5 restores to drive the second concave-convex structure 32 to rotate in a second direction, such that the first protrusion of the first concave-convex structure 22' becomes re-abutting contact with the corresponding first protrusion of the second concave-convex structure 32.

One of a clockwise direction and a counterclockwise direction is selected as the first direction, and the other is correspondingly selected as the second direction.

Referring to FIG. 7, an embodiment of the present disclosure further provides another variant example of the backlight module. This variant example differs from the above examples mainly in that the first concave-convex structure 22' is directly provided on the side 24 of the light guide plate 2", not on the recess 21 and the protrusion 21'. Operation principle of this variant example is substantially the same as the configuration shown in FIG. 6 and thus will not be repeatedly described. FIGS. 6 and 7 respectively show the back plate 1' and 1".

Further, the present disclosure also provides a display apparatus comprises the above-described backlight module, the display apparatus may be an apparatus such as a mobile phone, a computer, PAD or the like. Since the light guide plate 2 of the above backlight module can be firmly fixed on the back plate 1, the light guide plate 2 will not be shaken during moving the display apparatus, avoiding structure damage thereto.

In the present disclosure, both the position-limiting component of the back plate and the side of the light guide plate are provided with corresponding concave-convex structures. When the light guide plate is the first state or non-expansion state, the protrusion of the concave-convex structure of the position-limiting component is in abutting contact with the protrusion of the concave-convex structure of the light guide plate side, such that movement of the light guide plate can be limited by the position-limiting component. When the light guide plate is subject to heat to expand, the concave-convex structure of the position-limiting component will be pressed by the expanded light guide plate, such that the concave-convex structure of the position-limiting component is rotated with respect to the concave-convex structure on the side of the light guide plate, thereby being switched into meshing fixing therebetween, and at this time, the position-limiting component can still limit displacement of the expanded light guide plate. When the light guide plate is returned to the first state due to thermal contraction, the first concave-convex structure of the position-limiting component is no longer pressed by the light guide plate, and is restored, by means of the elasticity of the elastic member, into a state in which the protrusions of two concave-convex structures are in abutting contact with each other. Obviously, based on design of the limit scheme, not only a space may be reserved for the change in volume of the light guide plate due to thermal expansion and contraction, but also a position limiting effect may be always held for the light guide plate.

Although some embodiments according the general concepts of the present disclosure have been shown and described, it would be appreciated by those skilled in the art that various changes or modifications may be made in these embodiments without departing from the principles and spirit of the general concepts of the disclosure, the scope of which is defined in the claims and their equivalents.

What is claimed is:

1. A backlight module, comprising:
   a back plate;
   a light guide plate provided on the back plate, at least one side of the light guide plate comprising at least one first concave-convex structure; and
   at least one position-limiting component provided on the back plate, the position-limiting component comprising at least one second concave-convex structure, the at least one second concave-convex structure and the at least one first concave-convex structure being cooperated with each other and being rotatable with respect to each other within a plane where the light guide plate is located, such that a contact state of the cooperated first and second concave-convex structures is switchable between an abutting contact state and an intermeshing state.

2. The backlight module according to claim 1, further comprising a recess or protrusion formed in or on at least one side of the light guide plate, wherein the first concave-convex structure is correspondingly provided on the recess or protrusion.

3. The backlight module according to claim 2, wherein a surface of the recess or protrusion is adapted to a profile of a corresponding position-limiting component.

4. The backlight module according to claim 3, wherein the recess or protrusion is in an arc shape.

5. The backlight module according to claim 1, wherein the at least one first concave-convex structure is directly provided on a side of the light guide plate.

6. The backlight module according to claim 1, wherein the backlight module comprises a plurality of the first concave-convex structures and the second concave-convex structures which are cooperated with each other so as to position the light guide plate at least in a three-point positioning way.

7. The backlight module according to claim 1, wherein one of the at least one first concave-convex structure is cooperated with one of the at least one second concave-convex structure;
   one of the at least one first concave-convex structure is cooperated with more than one of the at least one second concave-convex structure; or
   more than one of the at least one first concave-convex structure is cooperated with one of the at least one second concave-convex structure.

8. The backlight module according to claim 1, wherein the first concave-convex structure is located at an upper position, a middle position, a lower position or any combination thereof on any side of the light guide plate.

9. The backlight module according to claim 1, wherein the backlight module further comprises an elastic member connected with the position-limiting component and configured to control rotation of the second concave-convex structure.

10. The backlight module according to claim 9, wherein the elastic member comprises a torsion spring or elastic remontoir.

11. The backlight module according to claim 9, wherein the light guide plate has a first state and a second state, the
first state being a state in which the light guide plate is not subject to heat expansion, the second state being a state in which the light guide plate is subject to heat expansion;
a first protrusion of the first concave-convex structure is in abutting contact with a corresponding first protrusion of the second concave-convex structure when the light guide plate is in the first state;
upon the light guide plate switching from the first state into the second state due to thermal expansion, the second concave-convex structure is pressed by the light guide plate to rotate in a first direction against the elastic member of the backlight module, such that the first concave-convex structure is meshed with the second concave-convex structure; and
upon the light guide plate switching from the second state into the first state due to thermal contraction, the elastic member restores to drive the second concave-convex structure to rotate in a second direction, such that the first protrusion of the first concave-convex structure is driven in re-abutting contact with the corresponding first protrusion of the second concave-convex structure,
wherein one of a clockwise direction and a counterclockwise direction is selected as the first direction, and the other of the clockwise direction and the counterclockwise directon is correspondingly selected as the second direction.

12. The backlight module according to claim 1, wherein the position-limiting component comprises a gear.

13. The backlight module according to claim 12, wherein the gear is made of steel or plastic.

14. The backlight module according to claim 9, further comprising a connection member or an adhesive between the position-limiting component and the elastic member, the connection member or adhesive being configured to arrange the position-limiting component on the back plate.

15. The backlight module according to claim 14, wherein the connection member comprises a stud bolt or pin shaft fixedly connected with or integrally formed with the position-limiting component.

16. The backlight module according to claim 14, wherein the back plate is provided with a through hole or groove, and the connection member is arranged in the through hole or groove, such that the second concave-convex structure is, when being pressed by the light guide plate, rotated around the connection member as a rotation axis relative to the first concave-convex structure within the plane where the light guide plate is located.

17. A display apparatus, comprising the backlight module of claim 1.

18. The backlight module according to claim 10, wherein the light guide plate has a first state and a second state, the
first state being a state in which the light guide plate is not subject to heat expansion, the second state being a state in which the light guide plate is subject to heat expansion;
a first protrusion of the first concave-convex structure is in abutting contact with a corresponding first protrusion of the second concave-convex structure when the light guide plate is in the first state;
upon the light guide plate switching from the first state into the second state due to thermal expansion, the second concave-convex structure is pressed by the light guide plate to rotate in a first direction against the elastic member of the backlight module, such that the first concave-convex structure is meshed with the second concave-convex structure; and
upon the light guide plate switching from the second state into the first state due to thermal contraction, the elastic member restores to drive the second concave-convex structure to rotate in a second direction, such that the first protrusion of the first concave-convex structure is driven in re-abutting contact with the corresponding first protrusion of the second concave-convex structure,
wherein one of a clockwise direction and a counterclockwise direction is selected as the first direction, and the other of the clockwise direction and the counterclockwise direction is correspondingly selected as the second direction.

19. The backlight module according to claim 15, wherein the back plate is provided with a through hole or groove, and the connection member is arranged in the through hole or groove, such that the second concave-convex structure is, when being pressed by the light guide plate, rotated around the connection member as a rotation axis relative to the first concave-convex structure within the plane where the light guide plate is located.

20. The backlight module according to claim 6, wherein
one of the at least one first concave-convex structure is cooperated with one of the at least one second concave-convex structure;
one of the at least one first concave-convex structure is cooperated with more than one of the at least one second concave-convex structure; or
more than one of the at least one first concave-convex structure is cooperated with one of the at least one second concave-convex structure.

* * * * *